United States Patent
Mayo Mayo et al.

(10) Patent No.: US 10,245,916 B2
(45) Date of Patent: Apr. 2, 2019

(54) LOW PROFILE AIR CONDITIONING SYSTEM

(71) Applicant: BERGSTROM, INC., Rockford, IL (US)

(72) Inventors: Luis Angel Mayo Mayo, Madrid (ES); Antonio Gálvez Beamonte, Madrid (ES); José Antonio García Gaitán, Madrid (ES)

(73) Assignee: Bergstrom, Inc., Rockford, IL (US)

( * ) Notice: Subject to any disclaimer, the term of this patent is extended or adjusted under 35 U.S.C. 154(b) by 137 days.

(21) Appl. No.: 15/034,517

(22) PCT Filed: Nov. 4, 2013

(86) PCT No.: PCT/US2013/068331
§ 371 (c)(1),
(2) Date: May 4, 2016

(87) PCT Pub. No.: WO2015/065495
PCT Pub. Date: May 7, 2015

(65) Prior Publication Data
US 2016/0311288 A1  Oct. 27, 2016

(51) Int. Cl.
*B60H 1/00* (2006.01)
*B60H 1/32* (2006.01)
(Continued)

(52) U.S. Cl.
CPC .......... *B60H 1/00207* (2013.01); *B60H 1/322* (2013.01); *B60H 1/3208* (2013.01);
(Continued)

(58) Field of Classification Search
CPC .... B60H 1/02; B60H 1/00207; B60H 1/3208; B60H 1/3226; B60H 1/32; B60H 1/3229;
(Continued)

(56) References Cited

U.S. PATENT DOCUMENTS 2,722,050 A   11/1955  Shank
2,789,234 A    6/1956  Lambert et al.
(Continued)

FOREIGN PATENT DOCUMENTS

CN   102398496 A     4/2012
DE    4440044 A1 *   5/1996   ......... B60H 1/00371
(Continued)

OTHER PUBLICATIONS

Alfa Laval Website http://www.alfalaval.com/ecore-Java/WebObjects/ecoreJava.woa/wa/shoNode?siteNodelID=1668&cont . . . ; date last visited May 18, 2007; 1 page.
(Continued)

*Primary Examiner* — Ana M Vazquez
(74) *Attorney, Agent, or Firm* — Morgan, Lewis & Bockius LLP

(57) ABSTRACT

The compact low-profile air conditioner unit is configured to be installed through the roof of a truck cabin, and run off of electrical power. The vehicle air conditioner includes a compressor, a blower fan, and a housing assembly. The housing assembly includes a mounting base having a top side and an opposing bottom side. The mounting base is configured to be mounted to a roof of a vehicle. The compressor and the blower fan are each mounted to the mounting base. When installed to the roof of the vehicle via the mounting base, the compressor and the blower fan each extend at least partially through the roof of the vehicle.

22 Claims, 8 Drawing Sheets

(51) Int. Cl.
*B62D 65/14* (2006.01)
*B62D 33/06* (2006.01)

(52) U.S. Cl.
CPC ......... *B60H 1/3226* (2013.01); *B60H 1/3229* (2013.01); *B62D 65/14* (2013.01); B60H 2001/00235 (2013.01); B62D 33/06 (2013.01)

(58) Field of Classification Search
CPC .......... B60H 1/322; B60H 2001/00235; B62D 65/14; B62D 33/06
See application file for complete search history.

(56) References Cited

U.S. PATENT DOCUMENTS

| | | | |
|---|---|---|---|
| 3,176,502 A | 4/1965 | Cizek et al. |
| 3,225,819 A | 12/1965 | Stevens |
| 3,590,910 A | 7/1971 | Lorenz |
| 3,627,030 A | 12/1971 | Lorenz |
| 3,807,087 A | 4/1974 | Staats |
| 3,844,130 A | 10/1974 | Wahnish |
| 3,880,224 A | 4/1975 | Weil |
| 3,885,398 A | 5/1975 | Dawkins |
| 3,948,060 A | 4/1976 | Gaspard |
| 3,995,443 A | 12/1976 | Iversen |
| 4,015,182 A | 3/1977 | Erdman |
| 4,034,801 A | 7/1977 | Bernstein |
| 4,071,080 A | 1/1978 | Bridgers |
| 4,217,764 A | 8/1980 | Armbruster |
| 4,271,677 A | 6/1981 | Harr |
| 4,280,330 A | 7/1981 | Harris et al. |
| 4,324,286 A | 4/1982 | Brett |
| 4,359,875 A | 11/1982 | Ohtani |
| 4,391,321 A | 7/1983 | Thunberg |
| 4,412,425 A | 11/1983 | Fukami |
| 4,448,157 A | 5/1984 | Eckstein et al. |
| 4,459,519 A | 7/1984 | Erdman |
| 4,577,679 A | 3/1986 | Hibshman |
| 4,604,036 A | 8/1986 | Sutou et al. |
| 4,617,472 A | 10/1986 | Slavik |
| 4,641,502 A | 2/1987 | Aldrich et al. |
| 4,658,593 A | 4/1987 | Stenvinkel |
| 4,667,480 A | 5/1987 | Bessler |
| 4,694,798 A | 9/1987 | Kato et al. |
| 4,748,825 A | 6/1988 | King |
| 4,825,663 A | 5/1989 | Nijar et al. |
| 4,841,733 A | 6/1989 | Dussault et al. |
| 4,856,078 A | 8/1989 | Konopka |
| 4,893,479 A | 1/1990 | Gillett et al. |
| 4,905,478 A | 3/1990 | Matsuda et al. |
| 4,945,977 A | 8/1990 | D'Agaro |
| 4,947,657 A | 8/1990 | Kalmbach |
| 4,952,283 A | 8/1990 | Besik |
| 4,982,576 A | 1/1991 | Proctor et al. |
| 5,025,634 A | 6/1991 | Dressler |
| 5,046,327 A | 9/1991 | Walker |
| 5,067,652 A | 11/1991 | Enander |
| 5,095,308 A | 3/1992 | Hewitt |
| 5,125,236 A | 6/1992 | Clancey et al. |
| 5,170,639 A | 12/1992 | Datta |
| 5,230,719 A | 7/1993 | Bermer et al. |
| 5,275,012 A | 1/1994 | Dage et al. |
| 5,307,645 A | 5/1994 | Pannell |
| 5,316,074 A | 5/1994 | Isaji et al. |
| 5,324,229 A | 6/1994 | Weisbecker |
| 5,333,678 A | 8/1994 | Mellum et al. |
| 5,361,593 A | 11/1994 | Dauvergne |
| 5,376,866 A | 12/1994 | Erdman |
| 5,396,779 A | 3/1995 | Voss |
| 5,402,844 A | 4/1995 | Elluin |
| 5,404,730 A | 4/1995 | Westmeyer |
| 5,426,953 A | 6/1995 | Meckler |
| 5,465,589 A | 11/1995 | Bender et al. |
| 5,497,941 A | 3/1996 | Numazawa et al. |
| 5,501,267 A | 3/1996 | Iritani et al. |
| 5,502,365 A | 3/1996 | Nanbu et al. |
| 5,524,442 A | 6/1996 | Bergman, Jr. et al. |
| 5,528,901 A | 6/1996 | Willis |
| 5,562,538 A | 10/1996 | Suyama |
| 5,586,613 A | 12/1996 | Ehsani |
| 5,647,534 A | 7/1997 | Kelz et al. |
| 5,657,638 A | 8/1997 | Erdman et al. |
| 5,682,757 A | 11/1997 | Peterson |
| 5,720,181 A | 2/1998 | Karl et al. |
| 5,761,918 A | 6/1998 | Jackson et al. |
| 5,775,415 A | 7/1998 | Yoshimi et al. |
| 5,782,610 A | 7/1998 | Ikeda |
| 5,819,549 A | 10/1998 | Sherwood |
| 5,896,750 A | 4/1999 | Karl |
| 5,898,995 A | 5/1999 | Ghodbane |
| 5,899,081 A | 5/1999 | Evans et al. |
| 5,901,572 A | 5/1999 | Peiffer et al. |
| 5,901,780 A | 5/1999 | Zeigler et al. |
| 5,921,092 A | 7/1999 | Behr et al. |
| 5,934,089 A | 8/1999 | Makagawa et al. |
| 5,982,643 A | 11/1999 | Phlipot |
| 5,996,363 A | 12/1999 | Kurachi et al. |
| 6,016,662 A | 1/2000 | Tanaka et al. |
| 6,028,406 A | 2/2000 | Birk |
| 6,038,877 A | 3/2000 | Peiffer et al. |
| 6,038,879 A | 3/2000 | Turcotte |
| 6,059,016 A | 5/2000 | Rafalovich et al. |
| 6,073,456 A | 6/2000 | Kawai et al. |
| 6,111,731 A | 8/2000 | Cepynsky |
| 6,112,535 A | 9/2000 | Hollenbeck |
| 6,125,642 A | 10/2000 | Seener et al. |
| 6,134,901 A | 10/2000 | Harvest et al. |
| 6,152,217 A | 11/2000 | Ito et al. |
| 6,193,475 B1 | 2/2001 | Rozek |
| 6,205,795 B1 | 3/2001 | Backman et al. |
| 6,205,802 B1 | 3/2001 | Drucker et al. |
| 6,209,333 B1 | 4/2001 | Bascobert |
| 6,209,622 B1 | 4/2001 | Lagace et al. |
| 6,213,867 B1 | 4/2001 | Yazici |
| 6,230,507 B1 | 5/2001 | Ban et al. |
| 6,253,563 B1 | 7/2001 | Ewert et al. |
| 6,265,692 B1 | 7/2001 | Umebayashi et al. |
| 6,276,161 B1 | 8/2001 | Peiffer et al. |
| 6,282,919 B1 | 9/2001 | Rockenfeller |
| 6,351,957 B2 | 3/2002 | Hara |
| 6,405,793 B1 | 6/2002 | Ghodbane et al. |
| 6,411,059 B2 | 6/2002 | Frugier et al. |
| 6,453,678 B1 | 9/2002 | Sundhar |
| 6,457,324 B2 | 10/2002 | Zeigler et al. |
| 6,467,279 B1 | 10/2002 | Backman et al. |
| 6,474,081 B1 | 11/2002 | Feuerecker |
| 6,530,426 B1 | 3/2003 | Kishita et al. |
| 6,543,245 B1 | 4/2003 | Waldschmidt et al. |
| 6,571,566 B1 | 6/2003 | Temple et al. |
| 6,575,228 B1 | 6/2003 | Ragland et al. |
| 6,626,003 B1 | 9/2003 | Kortüm et al. |
| 6,675,601 B2 | 1/2004 | Ebara |
| 6,684,863 B2 | 2/2004 | Dixon et al. |
| 6,725,134 B2 | 4/2004 | Dillen et al. |
| 6,745,585 B2 | 6/2004 | Kelm et al. |
| 6,748,750 B2 | 6/2004 | Choi |
| 6,758,049 B2 | 7/2004 | Adachi et al. |
| 6,889,762 B2 | 5/2005 | Zeigler et al. |
| 6,932,148 B1 | 8/2005 | Brummett et al. |
| 6,939,114 B2 | 9/2005 | Iwanami et al. |
| 6,965,818 B2 | 11/2005 | Koenig et al. |
| 6,981,544 B2 | 1/2006 | Iwanami et al. |
| 7,150,159 B1 | 12/2006 | Brummett et al. |
| 7,246,502 B2 * | 7/2007 | Hammonds ........ B60H 1/00371 165/42 |
| 7,316,119 B2 | 1/2008 | Allen |
| 7,350,368 B2 | 4/2008 | Heberle et al. |
| 7,591,143 B2 | 9/2009 | Zeigler et al. |
| 7,591,303 B2 | 9/2009 | Zeigler et al. |
| 7,614,242 B1 * | 11/2009 | Quesada Saborio ........ B60H 1/3232 62/298 |
| 7,637,031 B2 | 12/2009 | Salim et al. |
| 7,765,824 B2 | 8/2010 | Wong et al. |

(56) References Cited

U.S. PATENT DOCUMENTS

| | | |
|---|---|---|
| 8,001,799 B2 | 8/2011 | Obayashi et al. |
| 8,156,754 B2 | 4/2012 | Hong et al. |
| 8,276,892 B2 | 10/2012 | Narikawa et al. |
| 8,517,087 B2 | 8/2013 | Zeigler et al. |
| 8,821,092 B2 | 9/2014 | Nambara et al. |
| 8,905,071 B2 | 12/2014 | Coombs et al. |
| 8,919,140 B2 | 12/2014 | Johnson et al. |
| 8,947,531 B2 | 2/2015 | Fischer et al. |
| 9,157,670 B2 | 10/2015 | Kreeley et al. |
| 9,216,628 B2 | 12/2015 | Self et al. |
| 9,878,591 B2 | 1/2018 | Taniguchi et al. |
| 2001/0010261 A1 | 8/2001 | Oomura et al. |
| 2002/0020183 A1 | 2/2002 | Hayashi |
| 2002/0026801 A1 | 3/2002 | Yamashita |
| 2002/0036081 A1 | 3/2002 | Ito et al. |
| 2002/0042248 A1 | 4/2002 | Vincent et al. |
| 2002/0078700 A1 | 6/2002 | Kelm et al. |
| 2002/0084769 A1 | 7/2002 | Iritani et al. |
| 2002/0108384 A1 | 8/2002 | Higashiyama |
| 2002/0112489 A1 | 8/2002 | Egawa et al. |
| 2002/0157412 A1 | 10/2002 | Iwanami et al. |
| 2002/0157413 A1 | 10/2002 | Iwanami et al. |
| 2003/0041603 A1 | 3/2003 | Tada et al. |
| 2003/0105567 A1 | 6/2003 | Koenig et al. |
| 2003/0106332 A1 | 6/2003 | Okamoto |
| 2004/0060312 A1 | 4/2004 | Horn et al. |
| 2004/0168449 A1 | 9/2004 | Homan et al. |
| 2004/0221599 A1* | 11/2004 | Hille .................. B60H 1/00371 62/244 |
| 2005/0016196 A1 | 1/2005 | Kadle et al. |
| 2005/0109499 A1 | 5/2005 | Iwanami et al. |
| 2005/0161211 A1 | 7/2005 | Zeigler et al. |
| 2005/0230096 A1 | 10/2005 | Yamaoka |
| 2005/0257545 A1 | 11/2005 | Ziehr et al. |
| 2006/0042284 A1 | 3/2006 | Heberle et al. |
| 2006/0080980 A1 | 4/2006 | Lee et al. |
| 2006/0102333 A1 | 5/2006 | Zeigler et al. |
| 2006/0118290 A1 | 6/2006 | Klassen et al. |
| 2006/0151163 A1 | 7/2006 | Zeigler et al. |
| 2006/0151164 A1 | 7/2006 | Zeigler et al. |
| 2007/0131408 A1 | 6/2007 | Zeigler et al. |
| 2007/0144728 A1 | 6/2007 | Kinmartin et al. |
| 2007/0163276 A1 | 7/2007 | Braun et al. |
| 2007/0227167 A1 | 10/2007 | Shapiro |
| 2008/0017347 A1 | 1/2008 | Chung et al. |
| 2008/0110185 A1 | 5/2008 | Veettil et al. |
| 2008/0156887 A1 | 7/2008 | Stanimirovic |
| 2008/0196436 A1 | 8/2008 | Connell |
| 2008/0196877 A1 | 8/2008 | Zeigler et al. |
| 2008/0209924 A1 | 9/2008 | Yoon et al. |
| 2009/0211280 A1 | 8/2009 | Alston |
| 2009/0229288 A1 | 9/2009 | Alston et al. |
| 2009/0301702 A1 | 12/2009 | Zeigler et al. |
| 2010/0009620 A1 | 1/2010 | Kawato et al. |
| 2010/0218530 A1 | 9/2010 | Melbostad et al. |
| 2010/0263395 A1 | 10/2010 | Adachi et al. |
| 2011/0088417 A1 | 4/2011 | Kayser |
| 2011/0120146 A1 | 5/2011 | Ota et al. |
| 2011/0126566 A1 | 6/2011 | Jones et al. |
| 2011/0308265 A1 | 12/2011 | Phannavong |
| 2012/0102779 A1 | 5/2012 | Beers et al. |
| 2012/0118532 A1 | 5/2012 | Jentzsch et al. |
| 2012/0133176 A1* | 5/2012 | Ramberg ............. B62D 35/001 296/180.2 |
| 2012/0247135 A1 | 10/2012 | Fakieh |
| 2012/0318014 A1 | 12/2012 | Huff et al. |
| 2013/0040549 A1 | 2/2013 | Douglas et al. |
| 2013/0145781 A1 | 6/2013 | Liu |
| 2013/0167577 A1 | 7/2013 | Street |
| 2013/0319630 A1 | 12/2013 | Yamamoto |
| 2014/0066572 A1 | 3/2014 | Corveleyn |
| 2014/0075973 A1 | 3/2014 | Graaf et al. |
| 2014/0102679 A1 | 4/2014 | Matsudaira et al. |
| 2014/0241926 A1 | 8/2014 | Fraser |
| 2014/0290299 A1 | 10/2014 | Nakaya |
| 2015/0158368 A1 | 6/2015 | Herr-Rathke et al. |
| 2015/0210287 A1 | 7/2015 | Penilla et al. |
| 2015/0239365 A1 | 8/2015 | Hyde et al. |
| 2015/0306937 A1 | 10/2015 | Kitamura et al. |
| 2016/0144685 A1 | 5/2016 | Ochiai et al. |
| 2016/0146554 A1 | 5/2016 | Bhatia et al. |
| 2016/0229266 A1 | 8/2016 | Maeda et al. |
| 2017/0211855 A1 | 7/2017 | Fraser et al. |

FOREIGN PATENT DOCUMENTS

| | | |
|---|---|---|
| DE | 10014483 A1 | 11/2000 |
| DE | 102005004950 A1 | 8/2006 |
| DE | 102007028851 A1 | 12/2008 |
| DE | 102010054965 A1 | 6/2012 |
| EP | 0516413 A1 | 12/1992 |
| EP | 0958952 A1 | 11/1999 |
| EP | 0963895 A2 | 12/1999 |
| EP | 1024038 A2 | 8/2000 |
| EP | 1477748 A1 | 11/2004 |
| EP | 1700725 A1 | 9/2006 |
| EP | 1703231 A1 | 9/2006 |
| EP | 1970651 A1 | 9/2008 |
| EP | 2048011 A1 | 4/2009 |
| EP | 2196748 A2 | 6/2010 |
| EP | 2320160 A1 | 5/2011 |
| EP | 2894420 A1 | 7/2015 |
| FR | 2966391 A1 | 4/2012 |
| JP | H02-128915 A | 5/1990 |
| JP | 502121 A | 2/1993 |
| JP | H07186711 A | 7/1995 |
| JP | H97-76740 | 3/1997 |
| JP | H09318177 A | 12/1997 |
| JP | 2000-108651 | 4/2000 |
| JP | 2005044551 A | 4/2000 |
| JP | 2002-081823 A | 3/2002 |
| JP | 2006-264568 A | 10/2006 |
| JP | 201217029 A | 1/2012 |
| JP | 2014226979 A | 12/2014 |
| KR | 20090068136 A | 6/2009 |
| WO | WO 89/09143 A1 | 10/1989 |
| WO | WO 99/61269 | 12/1999 |
| WO | WO 00/00361 | 1/2000 |
| WO | WO 2006/082082 A1 | 8/2006 |
| WO | WO 2012/158326 A1 | 11/2012 |
| WO | WO 2014/112320 A1 | 7/2014 |
| WO | WO 2014/209780 A1 | 12/2014 |
| WO | WO 2015/076872 A1 | 5/2015 |

OTHER PUBLICATIONS

Bergstrom, Inc., International Search Report and Written Opinion, PCT/US2014/026687, dated Jul. 28, 2014, 12 pgs.

Bergstrom, Inc., International Preliminary Report on Patentability, PCT/US2014/026687, dated Sep. 15, 2015, 7 pgs.

Bergstrom, Inc., International Search Report and Written Opinion, PCT/US2014/026683, dated Jul. 3, 2014, 12 pgs.

Bergstrom, Inc., International Preliminary Report on Patentability, PCT/US2014/026683, dated Sep. 15, 2015, 6 pgs.

Bergstrom, Inc., Communication Pursuant to Rules 161(2) and 162 EPC, EP14717604.4, dated Oct. 23, 2015, 2 pgs.

Bergstrom, Inc., Communication Pursuant to Rules 161(2) and 162 EPC, EP14722438.0, dated Nov. 2, 2015, 2 pgs.

Connell, Office Action, U.S. Appl. No. 14/209,877, dated Nov. 27, 2015, 19 pgs.

Connell, Office Action, U.S. Appl. No. 14/209,961, dated Dec. 2, 2015, 14 pgs.

FlatPlate Heat Exchangers; GEA FlatPiate Inc.; website—http://www.flatplate.com/profile.html; date last visited Aug. 9, 2007; 3 pages.

Glacier Bay Inc., Glacier Bay's Home Page, page printed from a website, htt(?:i/web.archive.org/web/19990417062255/htt[2://www.glacierbay.com/, apparent archive date: Apr. 17, 1999, 1 page.

Glacier Bay Inc., Darpa/Glacier Bay ECS, pages printed from a website, httir//web.archive.org/web/19991104132941/wvvw.glacierbay.com/darQatxt.htm, apparent archive date: Nov. 4, 1999, 2 pages.

(56) References Cited

OTHER PUBLICATIONS

Glacier Bay Inc., Glacier Bay ECS DARPA Project-Final Report, pages printed from a website, httn://web.archive.or_gjweb/19991103001512/v•vww,_g.Jacierbay.com/Darn.htm, apparent archive date: Nov. 3, 1999, 9 pages.
"Glacier Bay Inc., Glacier Bay ECS DARPA Project—Project Photos, pages printed from a website, httg://web.archive.org/web/1999" 1103012854/www.glacierbay.com/Dargghotos.htm, apparent archive date: Nov. 3, 1999, 2 pages.
Glacier Bay Inc., Glacier Bay ECS DARPA Project—Operational Video, page printed from a website, httQ://web.archive.orq/web/19991022221040/wvvw.qlacierbay.com/DarQvid.htm, apparent archive date Oct. 22, 1999; 1 page.
Michael Löhle, Günther Feuerecker and Ulrich Salzer; NON Idling HVAC-modufe tor Long Distance Trucks;SAE TechnicalPaper Series 1999-01-1193; International Congress and Exposition, Detroit, Michigan; Mar. 1-4, 1999; 8 pages.
Mahmoud Ghodbane; On Vehicle Performance of a Secondary Loop A/C System; SAE Technical Paper Series 2000-01-1270; SAE 2000 World Congress, Detroit, Michigan; Mar. 6-9, 2000; 6 pages.
Masami Konaka and Hiroki Matsuo; SAE Technical Paper Series 2000-01-1271; SAE 2000 World Congress, Detroit, Michigan; Mar. 6-9, 2000; 7 pages.
Frank Stodolsky, Linda Gaines, and Anant Vyas; Analysis of Technology Options to Reduce the Fuel Consumption of Idling Trucks; Paper-Center for Transportation Research, Energy Systems Division, Argonne National Laboratory,9700 South Cass Avenue, Argonne, Illinois 60439;Jun. 2000; 30 pages.
Paper No. 26 in IPR2012-00027, Jun. 11, 2013, 12 pgs. (U.S. Pat. No. 7,591,303).
Patricia Gardie and Vincent Goetz; Thermal Energy Storage System by Solid Absorption for Electric Automobile Heating and Air-Conditioning; Paper; 1995, 5 pages.
TropiCool No-idle Heating & Cooling, 110V/12V High-efficiency, Self-contained, Electrified Heating/AC System; ACC Climate Control Brochure, Elkhart, Indiana; 2005, 1 page.
TropiCool Power Plus, More comfort. More efficiency. More options.; ACC Climate Control Brochure, Elkhart, Indiana; 2006, 3 pages.
Packless Industries, the leader in refrigerant to water coaxial heat exchangers, flexible hoses and sucti . . . ; website—http://www.packless.com/profile.htmle: date last visited Aug. 9, 2007; 1 page.
Zeigler, Office Action, U.S. Appl. No. 13/661,519, dated Mar. 11, 2013, 8 pgs.
Zeigler, Final Office Action, U.S. Appl. No. 13/661,519, dated Sep. 18, 2013, 15 pgs.
Zeigler, Office Action, U.S. Appl. No. 13/661,519, dated Apr. 9, 2014, 20 pgs.
Zeigler, Final Office Action, U.S. Appl. No. 13/661,519, dated Sep. 26, 2014, 23 pgs.
Zeigler, Office Action, U.S. Appl. No. 13/661,519, dated Oct. 28, 2015, 20 pgs.
Bergstrom, Inc., International Search Report and Written Opinion, PCT/US2013/068331, dated Nov. 7, 2014, 9 pgs.
Bergstrom, Inc., International Preliminary Report on Patentability, PCT/US2013/068331, dated May 10, 2016?, 6 pgs.
Bergstrom, Inc., Communication Pursuant to Rules 161(2) and 162 EPC, EP13795064.8, dated Jun. 22, 2016, 2 pgs.
Connell, Final Office Action, U.S. Appl. No. 14/209,877, dated Jun. 22, 2016, 17 pgs.
Connell, Final Office Action, U.S. Appl. No. 14/209,961, dated Jul. 25, 2016, 15 pgs.
Glacier Bay Inc., R & D, pages printed from a website, htt ://web.archive.org/web/20000121130306/www.glacierbay.com/R&D.htm, apparent archive date: Jan. 21, 2000, 2 pages.
Glacier Bay Inc., Company History, pages printed from a website, httg://web.archive.org/web/20000301153828/www .glacierbay.corn/History:.htrn, apparent archive date: Mar. 1, 2000, 2 pages.
Glacier Bay Inc., Contact, page printed from a website, httQ://web.archive.orq/web/19990508104511/W\"I!V . qlacierba:t.com/Contact.htm, apparent archive date: May 8, 1999; 1 page.
Zeigler, Notice of Allowance, U.S. Appl. No. 13/661,519, dated Jun. 17, 2016, 8 pgs.
Anonymous: "NITE Connected Climate Controlled Transport Monitoring/Mobile Internet of Things UI Design/Mobil UI: Progress/Printers/Internet of Things, User Inter . . . ," Oct. 19, 2016 retrieved from: URL:htps://za.pinterest.com/pin/192810427773981541/, 1 pgs.
Bergstrom, Inc., International Search Report and Written Opinion, PCT/US2016/021602, dated Nov. 3, 2016, 17 pgs.
Bergstrom, Inc., International Preliminary Report on Patentability, PCT/US2016/021602, dated Sep. 12, 2017, 11 pgs.
Bergstrom, Inc., International Search Report and Written Opinion, PCT/US2017/021346, dated Jul. 25, 2017, 11 pgs.
Bergstrom, Inc., International Search Report and Written Opinion, PCT/US2016/065812, dated Mar. 22, 2017, 12 pgs.
Bergstrom, Inc., International Preliminary Report on Patentability, PCT/US2016/065812, dated Jun. 12, 2018, 8 pgs.
Bergstrom, Inc., Communication Pursuant to Article 94(3), EP14717604.4, dated Jun. 2, 2017, 12 pgs.
Bergstrom, Inc. Communication Pursuant to Article 94(3), EP14722438.0, dated Jan. 24, 2018, 5 pgs.
Bergstrom, Inc. Extended European Search Report, EP16204254.3, dated Jul. 25, 2017, 8 pgs.
Bergstrom, Inc. Partial European Search Report, EP16204259.2, dated May 30, 2017, 14 pgs.
Bergstrom, Inc. Extended European Search Report, EP16204259.2, dated Oct. 25, 2017, 15 pgs.
Bergstrom, Inc. Corrected Extended European Search Report, EP16204259.2, dated Nov. 24, 2017, 15 pgs.
Bergstrom, Inc. Partial European Search Report, EP16204256.8, dated Jul. 13, 2017, 14 pgs.
Bergstrom, Inc. Extended European Search Report, EP16204256.8, dated Jan. 12, 2018, 11 pgs.
Bergstrom, Inc. Extended European Search Report, EP16204256.8, dated Dec. 1, 2017, 13 pgs.
Bergstrom, Inc., Office Action, CN201480027137.4, dated Mar. 3, 2017, 15 pgs.
Bergstrom, Inc., 2nd Office Action, CN201480027137.4, dated Jul. 13, 2017, 10 pgs.
Bergstrom, Inc., 3rd Office Action, CN201480027137.4, dated Jan. 17, 2018, 19 pgs.
Bergstrom, Inc., Office Action, CN201480027117.7, dated Mar. 9, 2017, 8 pgs.
Bergstrom, Inc., Patent Certificate, CN201480027117.7, Nov. 21, 2017, 3 pgs.
Bergstrom, Inc., 2nd Office Action, CN201380081940.1, dated Jan. 17, 2018, 13 pgs.
Connell, Final Office Action, U.S. Appl. No. 14/209,877, dated Dec. 29, 2016, 21 pgs.
Connell, Notice of Allowance, U.S. Appl. No. 14/209,877, dated May 16, 2017, 5 pgs.
Connell, Notice of Allowance, U.S. Appl. No. 14/209,877, dated Aug. 4, 2017, 7 pgs.
Connell, Notice of Allowance, U.S. Appl. No. 14/209,961, dated Jun. 15, 2017, 10 pgs.
Connell, Notice of Allowlance, U.S. Appl. No. 15/064,552, dated Jun. 1, 2017, 9 pgs.
Connell, Notice of Allowance, U.S. Appl. No. 14/995,119, dated Aug. 31, 2017, 7 pgs.
Connell, Office Action, U.S. Appl. No. 14/965,142, dated Aug. 29, 2017, 12 pgs.
Connell, Notice of Allowance, U.S. Appl. No. 14/965,142, dated Feb. 26, 2018, 8 pgs.
Connell, Office Action, U.S. Appl. No. 15/280,876, dated Dec. 14, 2017, 23 pgs.
Connell, Notice of Allowance, U.S. Appl. No. 15/280,876, dated Jun. 21, 2018, 8 pgs.
Connell, Office Action, U.S. Appl. No. 15/791,243, dated May 8, 2018, 12 pgs.
Connell, Office Action, U.S. Appl. No. 15/065,745, dated May 31, 2018, 44 pgs.

\* cited by examiner

LOW PROFILE AIR CONDITIONING SYSTEM

CROSS REFERENCE TO RELATED APPLICATION

This Application is a United States National Stage Application filed under 35 U.S.C. § 371 of PCT Patent Application Ser. No. PCT/US2013/068331 filed on Nov. 4, 2013.

TECHNICAL FIELD

The disclosed embodiments relate generally to vehicle air conditioning systems, and more particularly air conditioning systems mounted in the ceiling of a vehicle.

BACKGROUND

The global economic expansion has stressed the transportation industry's ability to keep up with the shipping demands for raw materials and finished products. As a result, the demand of the transportation industry to utilize existing personnel and vehicles has resulted in increased time on the road for each vehicle and driver in an attempt to meet the market demands.

In an effort to maintain the safety, regulations governing the amount of time that a driver may spend behind the wheel have been instituted. When such maximum times have been reached, the driver is required to pull over and rest. Evidence of this can be seen by the large number of trucks one regularly sees pulled over at locations such as toll plazas, weight stations, and rest stops. However, these locations often do not provide anywhere for the drivers to rest, necessitating continued occupancy within the vehicle.

In response to the needs of the transportation industry and in recognition of the locations where drivers are forced to rest, over-the-road vehicle manufacturers have continued to increase the emphasis on ergonomic factors in the design and manufacturer of their vehicles. Indeed, the interior of a modern over-the-road vehicle contains many features to minimize the stress and fatigue placed on the drivers during the operation of the vehicle. These features include vibration dampers, lumbar supports in the seats, and increased sound insulation that provide a comfortable environment for the driver. To accommodate the required rest periods, many over-the-road vehicles also include a sleeping compartment.

Unfortunately, some transport vehicles do not originally come equipped with air-conditioning or other heating, ventilation, and air conditioning systems (HVAC) units. This is especially true for the sleeping compartment, which typically do not include air-conditioning or other HVAC units. Thus, the main cabin or cab, and/or the sleeping compartment may be uncomfortable to the tractor-trailer drivers both when driving and when resting or sleeping.

Moreover, transport vehicles that have air-conditioning units, typically only allow the operation of such units when the vehicle's engine is turned on, forcing the over-the-road vehicle operators to choose between two less than ideal situations while trying to rest, i.e., either to continuously run their vehicle's engine (even while stopped) so that they may have heating or air conditioning while they rest, or to turn off their engine and try to rest in a non-temperature controlled environment, although temperatures can become extremely hot or cold depending on where the vehicle happens to be. While the first option improves convenience by providing a comfortable resting environment for the driver, it greatly increases the cost of operating the over-the-road vehicle and worsens air quality as the engine is continued to run, which burns additional fuel, simply to operate the air conditioning or HVAC unit. Similarly, while the second option does not increase the cost of be exposed to extreme environmental temperatures, thereby adversely affecting the ability of the driver to rest and potentially reducing the operator's performance and thus the safety of the operation of the vehicle.

It would be advantageous to provide an aftermarket air conditioning system that reduces the comfort and safety tradeoff disadvantages described above. There exists, therefore, a need in the art for an improved air-conditioning or HVAC system to provide a comfortable temperature controlled environment for the vehicle drivers both on and off the road.

SUMMARY

The HVAC embodiments described herein overcome the limitations and disadvantages discussed above. The terms HVAC system or HVAC unit are used herein for convenience, but may include only an air conditioning unit, only a heating unit, or a combination of both a heating unit and an air conditioning unit. Similarly, while many embodiments describe an air conditioner or air conditioning system, such systems are not limited to only cooling air, but may be used to condition air by making the air cooler, warmer, and/or changing other properties of the air, such as its humidity.

The embodiments described herein include an HVAC system, such as a vehicle air conditioner, configured to be installed in or on a vehicle to cool or heat the interior of the vehicle. It is advantageous to install this HVAC system at least partially into one or more compartments, such as the main cabin (cab) and/or a sleeping compartment of a transport vehicle to cool or heat the compartment(s). Installing the HVAC system in the roof is especially advantageous in cab-over-engine type trucks, such as those typically found in Europe, Asia, Africa, Australia, and South America due to their configuration.

However, a larger aftermarket HVAC unit installed in or on a transport vehicle has various disadvantages. They are often bulky, unsightly, and cause various problems. For instance, if the unit is installed completely in the cabin, it would occupy a significant volume of an already cramped interior of the cabin. If it is installed in the roof of the cabin there would be little if any headroom left for the driver in the cabin causing the driver discomfort which may lead to performance and safety concerns. If placed outside of the vehicle, it would be subject to the elements (rain, sleet, and snow) as well as general wear and tear from dirt and wind while driving. Furthermore, a large and bulky HVAC unit will significantly increase the aerodynamic drag on the vehicle, thereby decreasing the vehicle's fuel efficiency. Furthermore, a large and bulky HVAC unit cannot be installed on some of the taller cab-over-engine type trucks because of height restrictions.

In contrast to these bulky, unsightly, and large HVAC systems, which adversely affect the aerodynamics and hence fuel efficiency of the vehicles and exceed height restrictions when installed on some taller cab-over-engine type trucks, the HVAC units described herein have a low profile which provides numerous advantages. For instance, the low profile does not significantly cramp the headroom for the drivers when installed in a vehicle's compartment. Furthermore, this compact and low profile design does not cause excessive drag by extending too high above the top of the vehicle's roof. This in turn provides for increased fuel efficiency. Moreover, some HVAC units described herein are designed to allow installation on the roof of taller cab-over-engine type trucks without exceeding the height restrictions. Moreover, some HVAC units described herein are designed to reduce excessive environmental exposure due to its low profile. Furthermore, the low profile reduces wind noise providing a more pleasant experience for the driver. Additionally, this modular over cabin design allows for easy installation and maintenance as it is easy to access from outside the vehicle.

Furthermore, in some embodiments, the HVAC system is configured to use alternative sources of electrical power instead of (or in addition to) electrical power generated by the engine (e.g., power generated by the alternator of the engine). This is advantageous in that it allows the HVAC system to run when the engine is turned off (e.g., the engine is not running and/or the ignition of the truck is in an "off" position), such as when a tractor-trailer driver is sleeping at a rest area.

In some embodiments, the HVAC system includes a controller that selects one or more sources of power with which to power the HVAC system. For example, a user can connect the controller to multiple sources of electrical power, including any of a vehicle electrical power system, an auxiliary battery (or batteries), shore power, an auxiliary power unit, etc. The controller then selects one or more of the power sources based on an appropriate prioritization scheme. In some embodiments, when multiple power sources are available (e.g., electrically coupled to the controller and capable of providing power for operating the HVAC system), the controller selects a preferred power source to the exclusion of the other available power sources. Some examples of power source prioritization are described in U.S. Pat. No. 7,591,303, entitled "Vehicle Air Conditioning and Heating Method Providing Engine On and Engine Off Operation," filed on Dec. 29, 2005, which is incorporated by reference herein in its entirety.

In some embodiments, a compact low-profile vehicle HVAC unit is provided which is configured to be installed at least partially through the roof of a vehicle, and run off of electrical power. The HVAC system includes a compressor, a blower fan, and a housing assembly. The housing assembly includes a mounting base having a top side and an opposing bottom side. The mounting base is configured to be mounted to a roof of a vehicle. The compressor and the blower fan are each mounted to the mounting base. When installed to the roof of the vehicle via the mounting base, the compressor and the blower fan each extend partially below the roof of the vehicle and partially above the roof of a vehicle.

In another embodiment, a different vehicle HVAC unit is provided. The HVAC unit includes a housing assembly and a plurality of components (such as air conditioning components), disposed at least partially within the housing assembly. For instance, the air conditioning components include at least one compressor. The housing assembly is configured such that, when the HVAC system is installed in a vehicle, a first portion of an air conditioning component extends above a roof of the vehicle, and a second portion of the component extends below the roof of the vehicle.

In some embodiments, when the HVAC system is installed in a vehicle, a first portion of the compressor extends above a roof of the vehicle, and a second portion of the compressor extends below the roof of the vehicle. In some embodiments, the HVAC system has two compressors each having a first portion extending above the roof of the vehicle and a second portion extending below the roof of the vehicle.

In some embodiments, a first portion of a blower fan extends above a roof of the vehicle, and a second portion of the blower fan extends below the roof of the vehicle. In other embodiments, other components, such as an evaporator or a condenser are similarly situated such that a portion of each of these components extends above the roof of the vehicle and another portion of these components extend below the roof of the vehicle. It should be noted, however, that not all of the components need to extend partially through the roof Providing an HVAC system with one or more components extending both above and below the roof of the vehicle (i.e., extending partially through the cabin roof) allows for a compact and low-profile design, thus providing a more efficient, less bulky, and easier to install HVAC unit to heat or cool an interior of a vehicle.

The above summary provides a basic description of some of the aspects of the invention. This summary is not an extensive overview of the invention. It is not intended to identify key/critical elements of the invention or to delineate the scope of the invention. Its sole purpose is to present some of the concepts of the invention in a simplified form as a prelude to the more detailed description that is presented later.

Various embodiments of systems within the scope of the appended claims each have several aspects, no single one of which is solely responsible for the desirable attributes described herein. Without limiting the scope of the appended claims, some prominent features are described herein. After considering this discussion, and particularly after reading the section entitled "Detailed Description" one will understand how the features of various embodiments are used.

BRIEF DESCRIPTION OF THE DRAWINGS

For a better understanding of the aforementioned aspects of the invention as well as additional aspects and embodiments thereof, reference should be made to the Description of Embodiments below, in conjunction with the following drawings.

Like reference numerals refer to corresponding parts throughout the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present embodiments. However, it will be apparent to one of ordinary skill in the art that the various embodiments may be practiced without these specific details. In other instances, well-known methods, procedures, or components have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first element could be termed a second element, and, similarly, a second element could be termed a first element, without changing the meaning of the description, so long as all occurrences of the first element are renamed consistently and all occurrences of the second element are renamed consistently. The first element and the second element are both elements, but they are not the same element.

Figure 1:
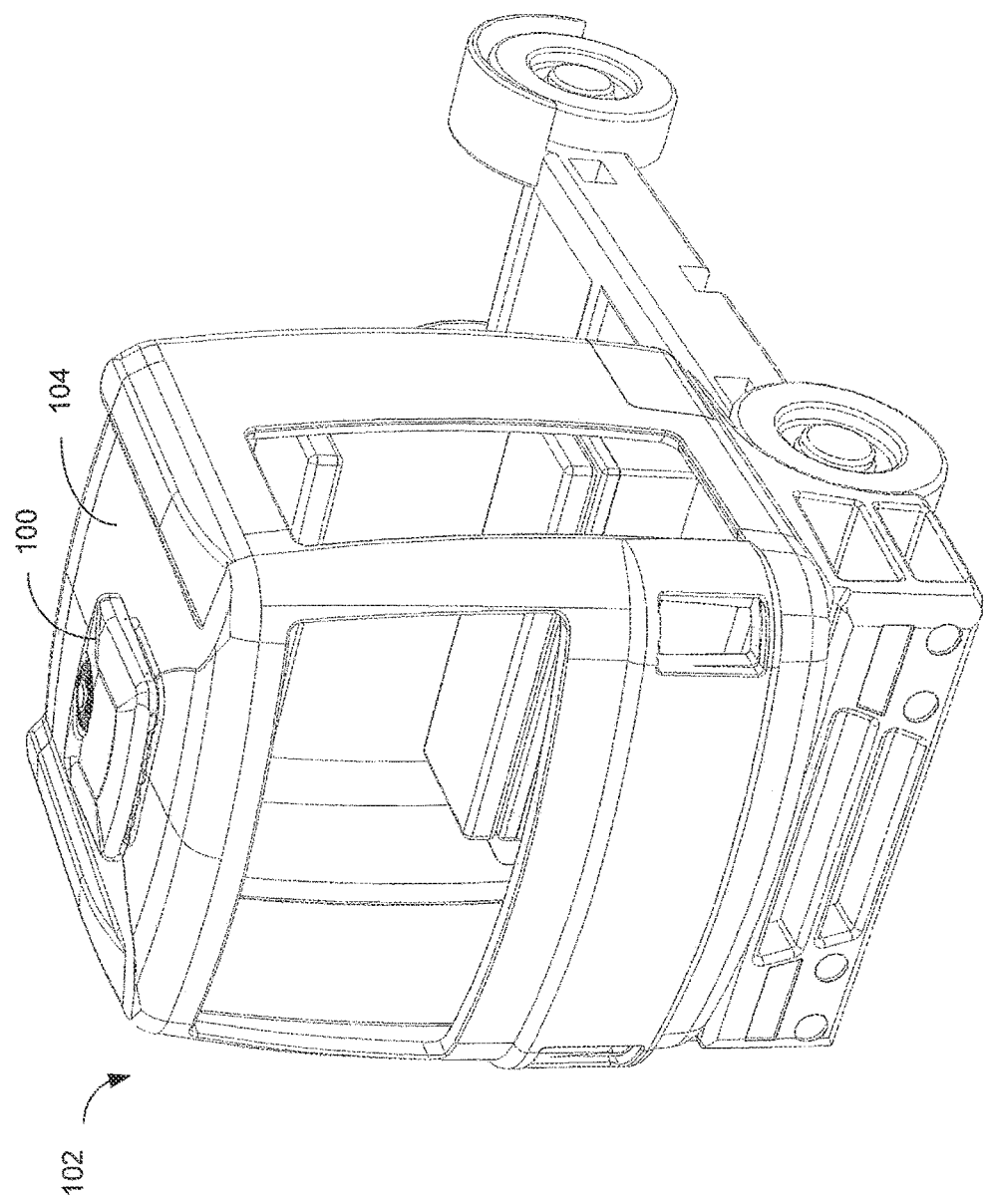
FIG. 1 is a perspective view of a cab-over-engine truck with an air conditioner installed through the roof of the cab, in accordance with some embodiments.

The terminology used in the description of the embodiments herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," as well as the terms "includes" and/or "including" when used in this specification, specify the presence of stated features, integers, steps, operations, elements, and/or components, but do not preclude the presence or addition of one or more other features, integers, steps, operations, elements, components, and/or groups thereof FIG. 1 is a perspective view of an HVAC system, such as a vehicle air conditioner 100 installed through the roof 104 of a vehicle 102. In some embodiments, the vehicle 102 is a truck. In some embodiments, the vehicle 102 is a cab-over-engine truck, such as those commonly used in Europe. In some embodiments, the vehicle air conditioner 100 is compact and has a low-profile, as illustrated herein. As such, the vehicle air conditioner 100 is small enough not to occupy precious headroom in the vehicle cabin. Occupying too much headroom in the cabin may cause driver discomfort resulting in lower performance and consequential safety concerns. Furthermore, this compact and low-profile design of the vehicle air conditioner 100 does not cause excessive drag by extending too far out the top of the cabin of the vehicle 102. Furthermore, this compact and low-profile design of the vehicle air conditioner 100 does not exceed height restrictions when assembled on the roof of taller cab-over-engine type trucks (such as the vehicle 102).

In some embodiments, the vehicle air conditioner 100 is configured to run off electrical power. In some embodiments, the vehicle air conditioner 100 is configured to run off electrical power when the vehicle's engine is not running This is advantageous in that it allows the vehicle air conditioner 100 to function when the vehicle's engine is not running, such as when a driver is sleeping at a rest area. In some embodiments, the vehicle air conditioner runs off a battery having suitable capacity. For instance, in some embodiments it runs off of the vehicle's starter battery. In other embodiments a battery bank, separate from the vehicle's starter battery is provided to run the vehicle air conditioner 100. In some embodiments, the HVAC unit is additionally configured to run off shore power when available.

Figure 2:
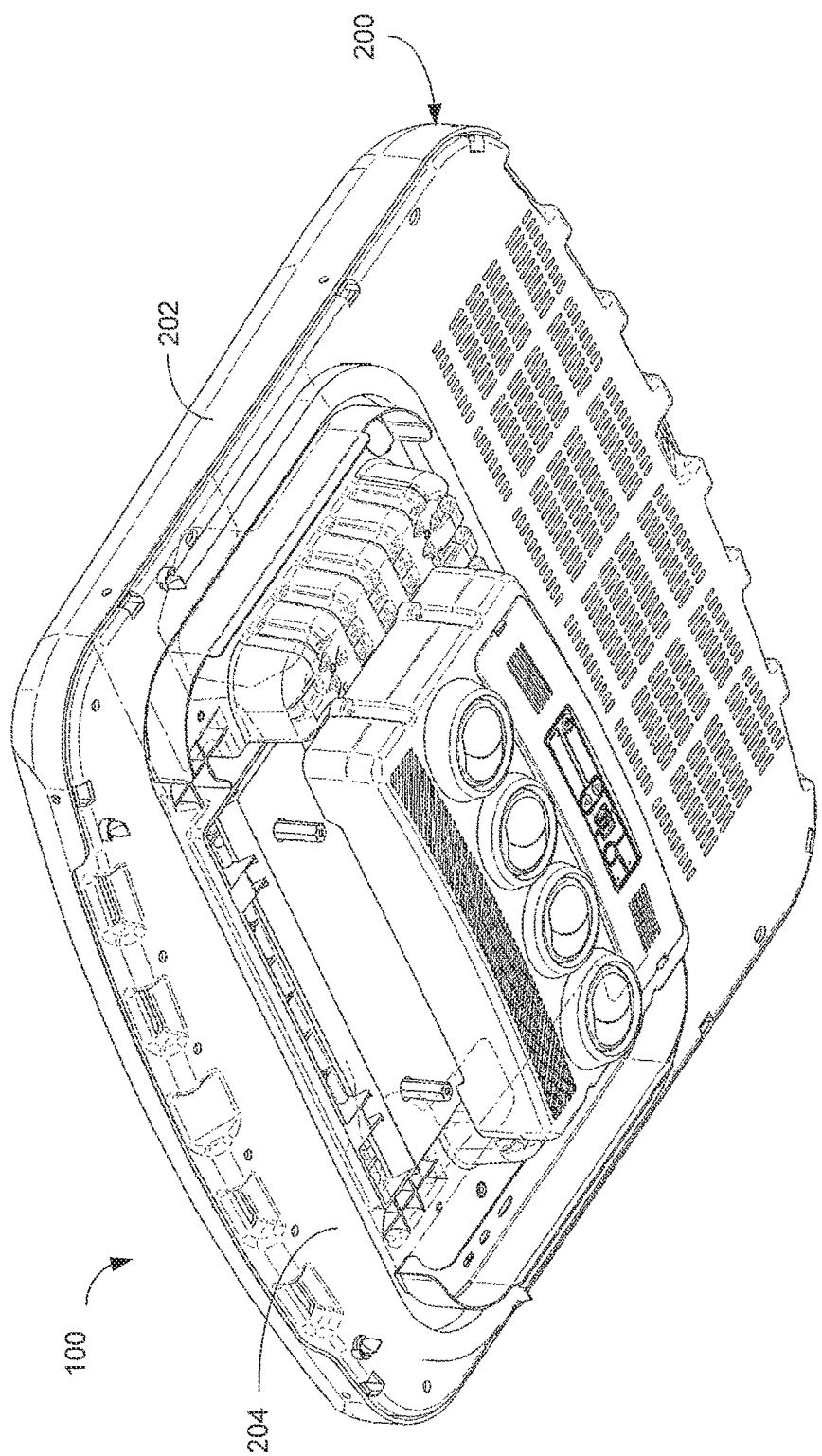
FIG. 2 is a perspective view of the vehicle air conditioner shown in FIG. 1.

FIG. 2 is a perspective view of the vehicle air conditioner 100, in accordance with some embodiments. The vehicle air conditioner 100 includes a housing assembly 200. The housing assembly is configured such that, when installed, a first portion 202 of the vehicle air conditioner 100 extends above a vehicle's roof while a second portion 204 extends below the roof of the vehicle. In some embodiments, the first portion 202 of the housing assembly is a top cover and the second portion 204 is a mounting base (e.g., mounting base 500 of FIG. 5.)

In some embodiments, the housing assembly 200 at least partially encases a plurality of air conditioning components. As such, when installed, a first portion of at least one of the plurality of air conditioning components extends above a roof 104 of the vehicle, and a second portion of the at least one of the plurality of air conditioning components extends below the roof 104 of the vehicle, i.e., one or more components extend partially through the roof. The way in which various components extend above and below the roof is illustrated in more detail with respect to the following figures.

As mentioned above, the housing assembly 200 is configured to be relatively flat and low-profile. One benefit of this low-profile design is that it provides adequate headroom for vehicle drivers (who in some embodiments are sitting underneath the vehicle air conditioner installed through the roof of the vehicle). Another benefit of a low-profile design is that it minimizes aerodynamic drag caused by the adding component above the vehicle's roof. The lower the profile of the design, the less drag it will cause. Another benefit of a low-profile design is that it does not exceed height restrictions when assembled on the roof of taller cab-over-engine type trucks.

In some embodiments, the vehicle air conditioner has an overall height (from top to bottom) of approximately 285 mm. Furthermore, in some embodiments, the vehicle air conditioner has a top portion that is approximately 116 mm high. As such, when the vehicle air conditioner is installed in the vehicle it extends above the vehicle by the height of the top portion plus the height of a gasket positioned between the unit and the roof of the vehicle (e.g., the gasket having a height between approximately 12 mm and approximately 22 mm). As such, in some embodiments, when the vehicle air conditioner 100 is installed in the vehicle 102, it extends between 128 mm and 138 mm above the roof 104 of the vehicle 102. Similarly, a typical vehicle has a liner between the interior space of the cabin and the cabin roof that has a thickness of between approximately 50 mm and approximately 70 mm, the vehicle air conditioner will extend into the cabin of the vehicle by the total amount of the height of the vehicle air conditioner less the height of the gasket, the liner, and the top portion (extending above gasket). For instance, in some embodiments, the vehicle air conditioner 100 extends into the cabin by 77 mm to 107 mm.

In other embodiments, the vehicle air conditioner has a housing assembly 200 that is configured such that, when the vehicle air conditioner 100 is installed in the vehicle 102, the vehicle air conditioner 100 extends less than 170 mm above a mounting surface (e.g., a roof 104) of the vehicle 102. In other embodiments, the vehicle air conditioner has a housing assembly 200 that is configured such that, when the vehicle air conditioner 100 is installed in the vehicle 102, the vehicle air conditioner 100 extends less than 140 mm above a mounting surface (e.g., a roof 104) of the vehicle 102.

Finally, in still other embodiments, the vehicle air conditioner 100 has a housing assembly 200 that is configured such that, when the vehicle air conditioner 100 is installed in the vehicle 102, the vehicle air conditioner 100 extends less than 120 mm above a mounting surface (e.g., a roof 104) of the vehicle 102.

In other embodiments, the vehicle air conditioner has a housing assembly 200 that is configured such that, when the vehicle air conditioner 100 is installed in the vehicle 102, the vehicle air conditioner 100 extends less than 115 mm beyond an interior surface (e.g., an interior liner of the roof 104) of the vehicle 102. In other embodiments, the vehicle air conditioner has a housing assembly 200 that is configured such that, when the vehicle air conditioner 100 is installed in the vehicle 102, the vehicle air conditioner 100 extends less than 100 mm below the interior surface of the vehicle 102. Finally, in still other embodiments, the vehicle air conditioner 100 has a housing assembly 200 that is configured such that, when the vehicle air conditioner 100 is installed in the vehicle 102, the vehicle air conditioner 100 extends less than 75 mm below an interior surface of the vehicle 102.

Figure 3:
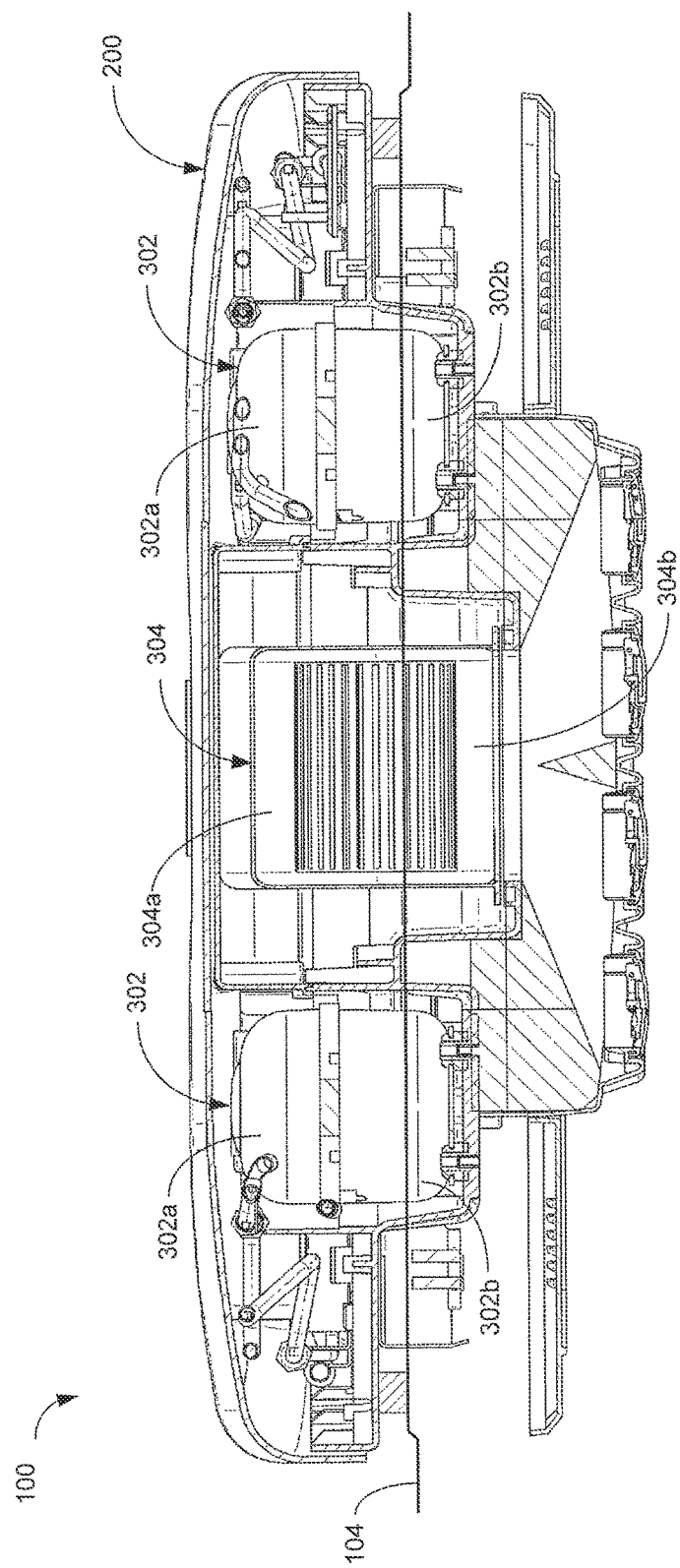
FIG. 3 is a cut-away front view of a of the vehicle air conditioner shown in FIGS. 1 and 2.

FIG. 3 is cut-away front view of a of vehicle air conditioner 100, in accordance with some embodiments. As explained above, in some embodiments the air vehicle air conditioner 100 is configured to be installed on the roof 104 of a vehicle 102, and run off electrical power.

The vehicle air conditioner 100 includes a housing assembly 200 and a plurality of air conditioning components, disposed at least partially within the housing assembly 200. When the vehicle air conditioner 100 is installed, some of the components extend above the roof 104, some extend below the roof 104, and some have portions extending both above and below the roof 104. Thus, the entire vehicle air conditioner can be kept relatively flat, i.e., it will have a low profile.

The air conditioning components include at least one compressor 302 disposed at least partially within the housing assembly 200. The embodiment illustrated in FIG. 3 includes two compressors 302. One benefit of a two compressor 302 (or multiple compressors) system is that the multiple compressors can achieve the same amount of cooling as a single compressor while reducing the total height of the air conditioner 100. In other words, each compressor 302 can be shorter than a single large compressor, and when the shorter compressors work together they can achieve the same amount of cooling, allowing the entire vehicle air conditioner 100 to have a low profile (e.g., extending less than 170 mm above the mounting surface of the vehicle as explained with respect to FIG. 2).

The low-profile of the air conditioner 100 can be further improved by allowing the compressors 302 to extend at least partially into the vehicle cabin 104. In accordance with some embodiments, when the air conditioner 100 is installed in a vehicle 102, a first portion 302a of the compressor 302 extends above a roof 104 of the vehicle, and a second portion of the compressor 302b extends below the roof 104 of the vehicle. In some embodiments, as illustrated in FIG. 3, when the vehicle air conditioner 100 has two compressors 302 each compressor has a first portion 302a extending above the roof of the vehicle and a second portion 302b extending below the roof 104 of the vehicle.

In some embodiments, the housing assembly 200 is configured to be mounted to the roof 104 of the vehicle 102 in such a way that the second potion 302b of the compressor 302 extends below the roof 104 of the vehicle through an opening or hole in the roof 104 of the vehicle 102.

In some embodiments, the air conditioning unit includes a blower fan 304. And similarly, in some embodiments, the housing assembly 200 is configured such that, when the vehicle air conditioner 100 is installed in the vehicle 102, a first portion of the blower fan 304a extends above a roof 104 of the vehicle, and a second portion 304b of the blower fan extends below the roof 104 of the vehicle.

The embodiment illustrated in FIG. 3 includes one blower fan 304. However, other embodiments include two blower fans 304. For instance, in some embodiments the motor driving the fan will have two shafts thus driving two blower fan wheels. One benefit of a two blower fan wheels (or multiple blower fan wheels) system is that the multiple blower fan wheels can achieve the same amount of air flow into the cabin of a vehicle as a single blower fan while reducing the total height of the air conditioner 100. In other words, each blower fan wheel can be shorter than a single large blower fan wheel, and when the shorter blower fan wheels work together they can achieve the same amount of air flow and thus the same amount of cooling of the cabin, allowing the entire vehicle air conditioner 100 to have a low profile (e.g., extending less than 170 mm above the mounting surface of the vehicle as explained with respect to FIG. 2).

Figure 4:
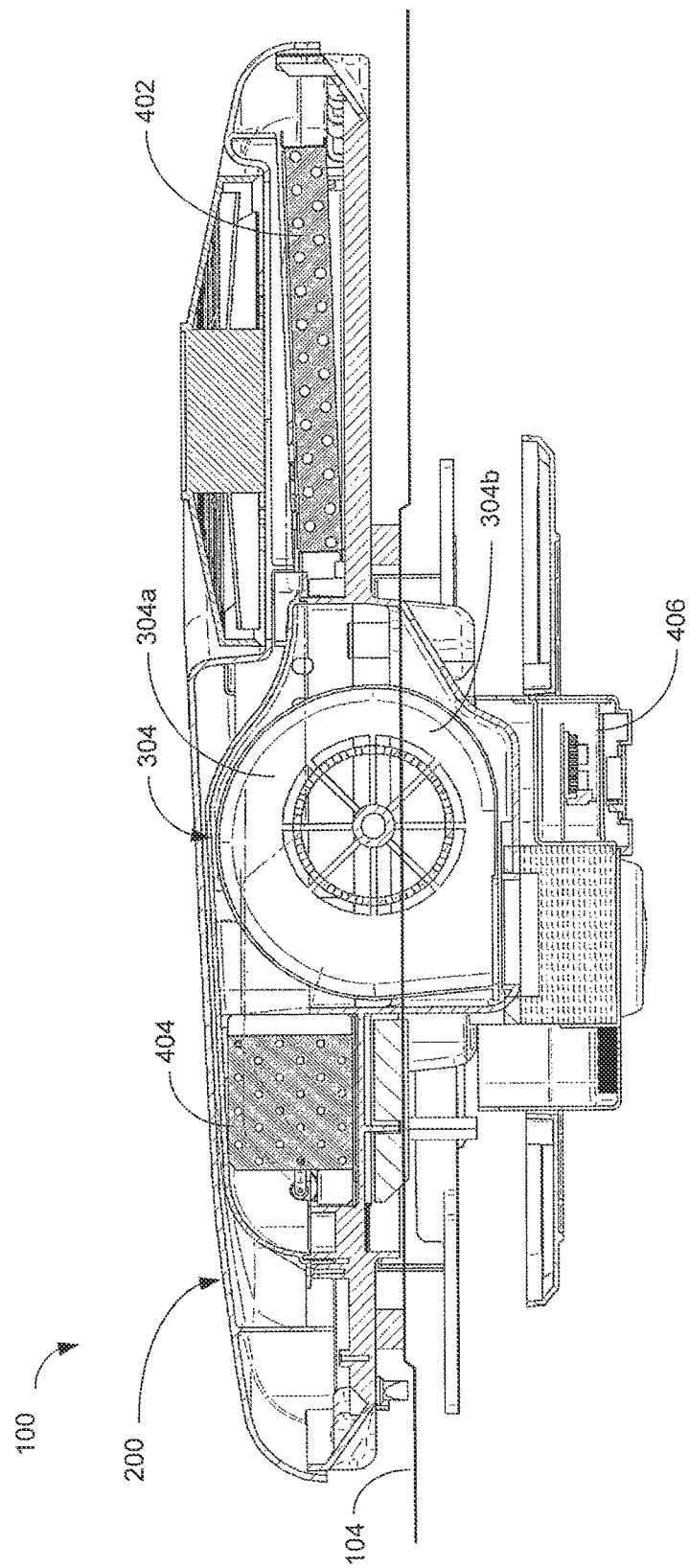
FIG. 4 is cut-away side view of a of the vehicle air conditioner shown in FIGS. 1, 2, and 3.

FIG. 4 is a cut-away side view of the vehicle air conditioner 100 in accordance with some embodiments. As mentioned with respect to FIG. 3, the vehicle air conditioner 100 includes a housing assembly 200 and a plurality of air conditioning components disposed within it. Because FIG. 4 shows a different cut away view, it provides a clearer view of different components than those shown in FIG. 3 although both are images of the same embodiment. When the vehicle air conditioner 100 is installed in a vehicle 102, some of the components extend above the roof 104, some extend below the roof 104, and some have portions extending both above and below the roof 104 which allows the entire vehicle air conditioner 100 to have a low-profile.

In some embodiments, the air conditioning unit includes a condenser 402 disposed at least partially within the housing assembly 200. In some embodiments, as illustrated in FIG. 4, the housing assembly is configured such that, when the vehicle air conditioner 100 is installed in the vehicle, the condenser 402 is disposed above the roof 104 of the vehicle. In other embodiments, the condenser 402 and housing assembly 200 are configured such that when the air vehicle air conditioner 100 is installed in the vehicle, a first portion of the condenser 402 extends above the roof 104 of the vehicle, and a second portion of the condenser 402 extends below the roof 104 of the vehicle. In still other embodiments, the condenser 402 and the housing assembly 200 are configured such that when the vehicle air conditioner 100 is installed in the vehicle, the condenser 402 is disposed below the roof 104 of the vehicle.

In some embodiments, the air conditioning unit includes an evaporator 404. As illustrated in FIG. 4, in some embodiments the housing assembly 200 is configured such that, when the vehicle air conditioner 100 is installed in the vehicle, the evaporator 404 is disposed above the roof 104 of the vehicle. In other embodiments, the evaporator 404 and the housing assembly 200 are configured such that when the vehicle air conditioner 100 is installed in the vehicle, the evaporator 404 is instead disposed below the roof 104 of the vehicle. In still other embodiments, the evaporator 404 and housing assembly 200 are configured such that when the vehicle air conditioner 100 is installed in the vehicle, a first portion of the evaporator 404 extends above a roof 104 of the vehicle, and a second portion of the evaporator 404 extends below the roof 104 of the vehicle, similar to the positioning of the blower fan 304 and the compressor(s) 302 illustrated in FIG. 3.

In some embodiments, the air conditioning unit includes an electronic controller 406. As illustrated in FIG. 4, in some embodiments the housing assembly 200 is configured such that, when the vehicle air conditioner 100 is installed in the vehicle, the electronic controller 406 is disposed below a roof 104 of the vehicle. In other embodiments, the electronic controller 406 and housing assembly 200 are configured such that when the vehicle air conditioner 100 is installed in the vehicle, the electronic controller 406 is instead disposed above the roof 104 of the vehicle. In still other embodiments, the electronic controller 406 and housing assembly 200 are configured such that when the vehicle air conditioner 100 is installed in the vehicle, a first portion of the electronic controller 406 extends above the roof 104 of the vehicle, and a second portion of the electronic controller 406 extends below the roof 104 of the vehicle. In some embodiments, the electronic controller 406 is or includes a thermostat that determines when the HVAC system should operate to cool or heat the cabin of the vehicle. In some embodiments, the electronic controller 406 selects one or more sources of power with which to power the HVAC system For example, electronic controller 406 is configured to connect to multiple sources of electrical power, including any of a vehicle electrical power system, an auxiliary battery (or batteries), shore power, an auxiliary power unit, etc. The electronic controller 406 then selects one or more of the power sources based on an appropriate prioritization scheme. Some examples of power source prioritization are described in U.S. Pat. No. 7,591,303, entitled "Vehicle Air Conditioning and Heating Method Providing Engine On and Engine Off Operation," filed on Dec. 29, 2005, which is incorporated by reference herein in its entirety.

Figure 5:
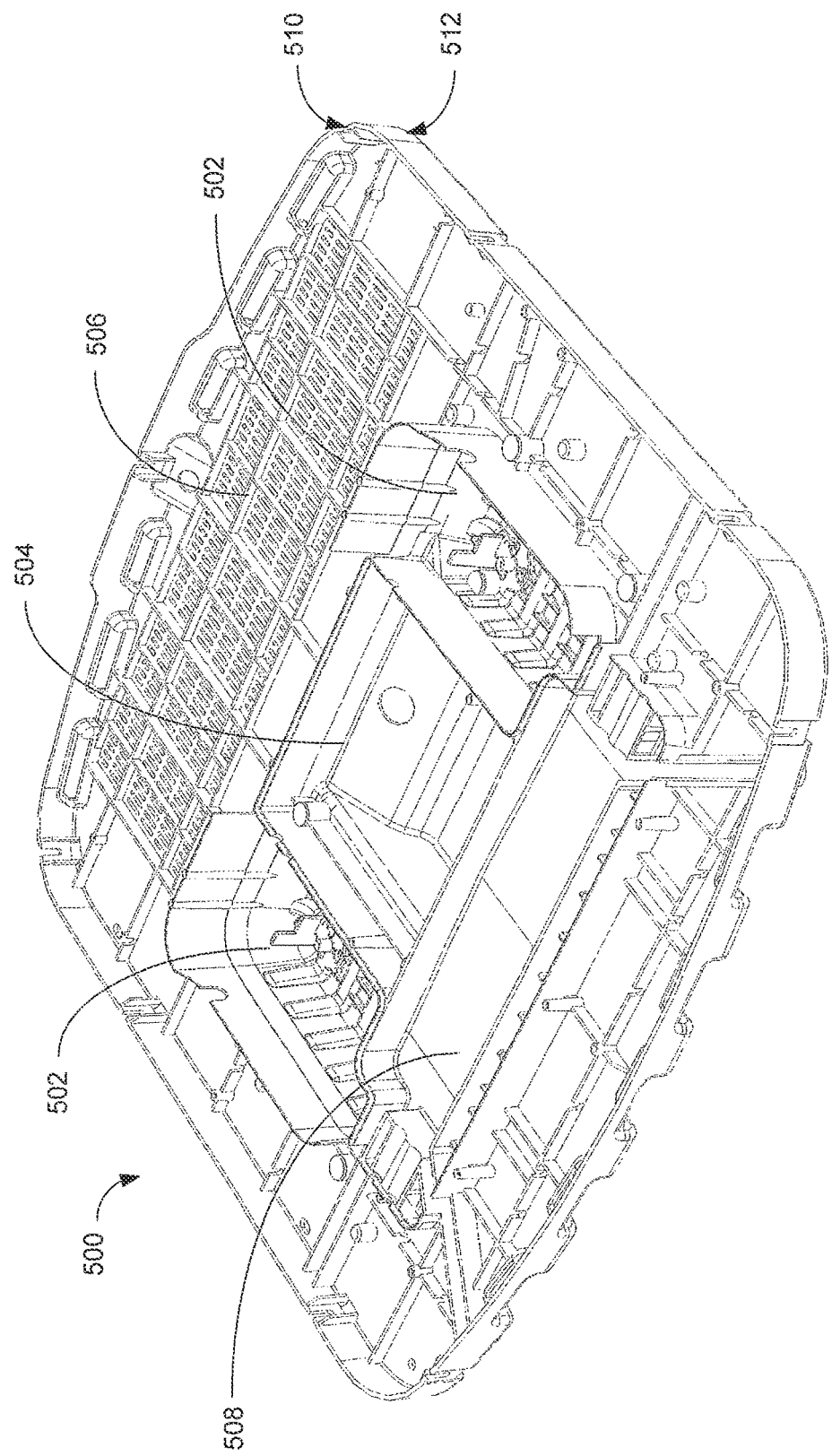
FIG. 5 is a perspective view of a mounting base, in accordance with some embodiments.
Figure 7:
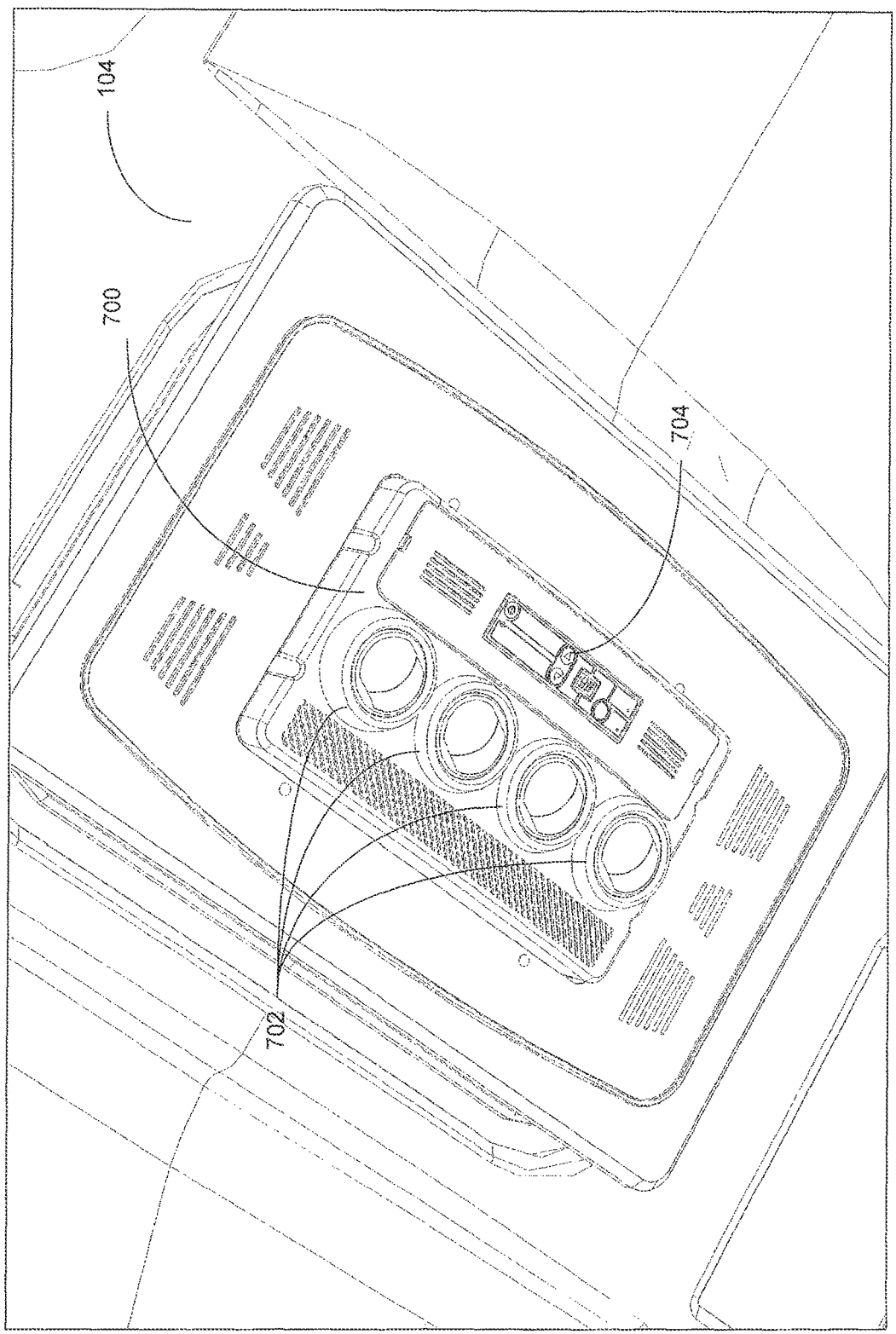
FIG. 7 is a perspective view of the bottom of the vehicle air conditioner when installed in the roof of a vehicle, in accordance with some embodiments.

FIG. 5 is a perspective view of a mounting base 500 for the housing assembly of the vehicle air conditioner 100, in accordance with some embodiments. In some embodiments, the housing assembly 200 includes a top cover (204, FIG. 2) and the mounting base 500. In some implementations, when the vehicle air conditioner 100 is installed in a vehicle, all, or substantially all, of the mounting base 500 extends below the roof 104 of the vehicle 102. In other implementations, only the recesses of the mounting base 500 extend below the roof 104. In some embodiments, a control assembly 700 mounts to the mounting base 500. The control assembly 700 includes and ducts the cool air into the cabin and has louvers to distribute the air as illustrated in FIG. 7.

As illustrated in FIG. 5, the mounting base 500 is essentially a solid tray with a plurality of recesses. In some embodiments, the mounting base 500 is injection molded. One or more first recesses 502 are configured to receive or partially receive a compressor (302, FIG. 3). FIG. 5 illustrates a mounting base 500 having two compressor recesses 502 because of the benefits of having multiple compressors as discussed with respect to FIG. 3. In some embodiments, mounting base also includes a second recess 504 that is configured to receive or partially receive a blower fan (304, FIG. 3). Similarly, in some embodiments the mounting base 500 includes a third recess 506 configured to receive or partially receive a condenser (402, FIG. 4) and/or a fourth recess 508 configured to receive or partially receive an evaporator (404, FIG. 4).

In some embodiments, instead of being a solid tray, the mounting base 500 has a plurality of openings configured to allow various air conditioning components to pass there through. For instance, in some embodiments, the housing assembly 200 includes a mounting base 500 having opposing first 510 and second 512 sides; and includes an opening configured to allow a compressor (302, FIG. 3) to extend through the mounting base 500 from the first 510 side to the second 512 side. Similarly, in some embodiments the mounting base includes an opening configured to allow a blower fan (304, FIG. 3) to extend through the mounting base from the first side 510 to the second side 512. In some embodiments, the mounting base 500 may also be configured to allow a condenser (402, FIG. 4) and/or an evaporator (404, FIG. 4) to extend through the mounting base 500 from the first side 510 to the second side 512.

Figure 6:
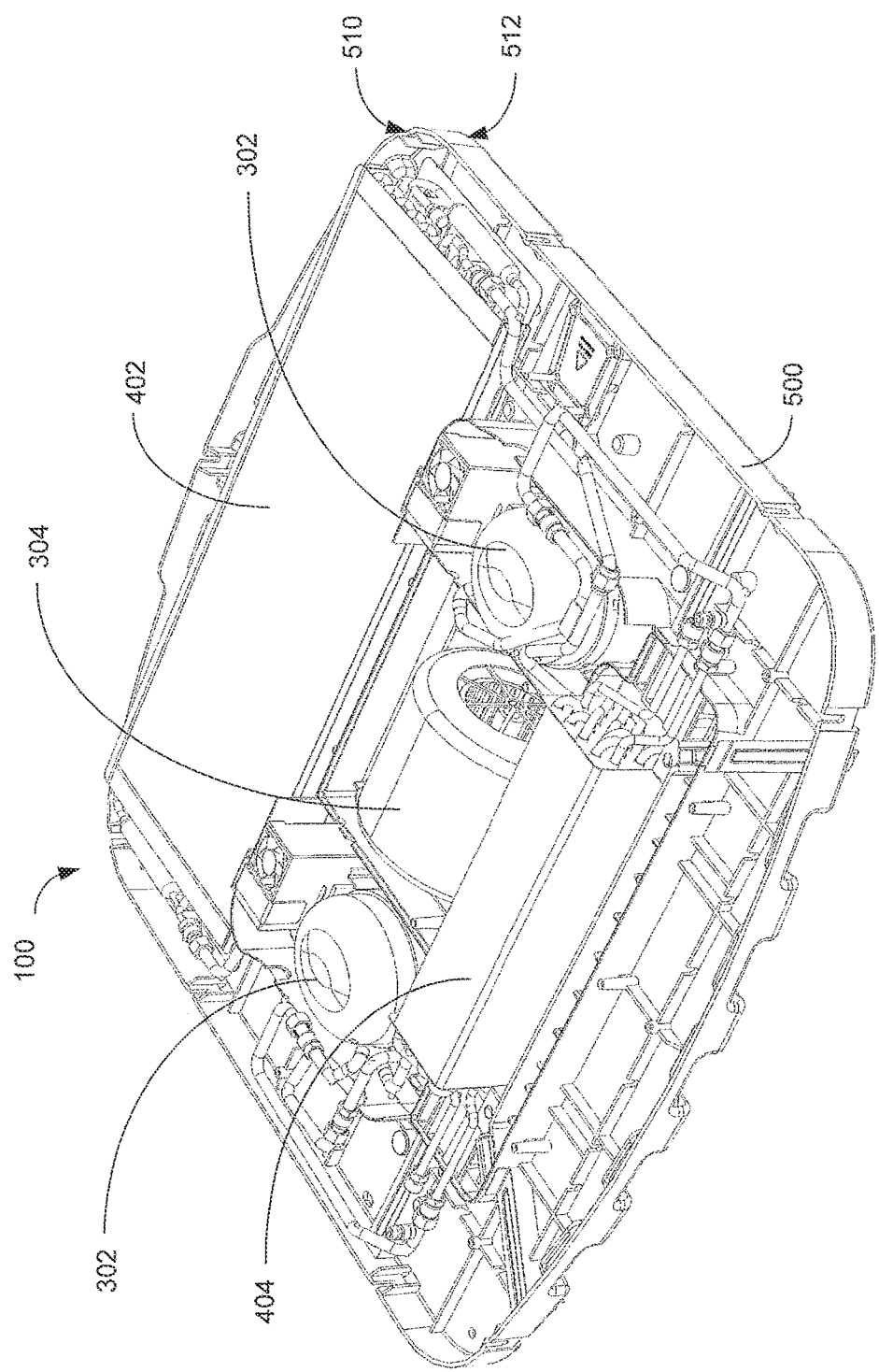
FIG. 6 is a perspective view of the vehicle air conditioner of FIGS. 1-5, with the top cover removed, in accordance with some embodiments.

FIG. 6 is a perspective view of a vehicle air conditioner 100 with the top cover (202, FIG. 2) removed, in accordance with some embodiments. In FIG. 6, two compressors 302, a blower fan 304, a condenser 402, and an evaporator 404 are shown all at least partially disposed in the mounting base 500 within their respective recesses. In other embodiments, one or more of the compressors 302, the blower fan 304, the condenser 402, and/or the evaporator 404 extends through a respective opening the mounting base 500 from the first side 510 to the second side 512.

In some embodiments, the above described components of the vehicle air conditioner 100 are arranged as follows. The vehicle air conditioner 100 includes a compressor 302, a blower fan 304, and a housing assembly 200. The housing assembly 200 includes a mounting base 500 having a top side (first side 510) and an opposing bottom side (second side 512). The mounting base 500 is configured to be mounted to a roof 104 of a vehicle 102 (as shown in FIG. 1). The compressor 302 and the blower fan 304 are each mounted to the mounting base 500. When installed to the roof 104 of the vehicle 102 via the mounting base 500, the compressor 302 and the blower fan 304 each extend below the roof 104 of the vehicle 102 as well as above the roof 104 of a vehicle 102.

FIG. 7 is a perspective view of a control assembly 700 on the bottom of the vehicle air conditioner 100, when installed in the roof 104 of a vehicle 102, in accordance with some embodiments. Depending on the embodiment, the control assembly 700 is integrally formed with or is separately attached to at least part of the second 512 side of the mounting base 500 (see FIG. 5.) The control assembly 700 of the vehicle air conditioner 100 is the portion that the user, e.g., an operator of a transport vehicle, manipulates in order to control the functions of the vehicle air conditioner 100. As such, the control assembly 700 of the vehicle air conditioner 100 includes one or more air vents 702. In some embodiments, the air vents 702 are configured to be manipulated into an open position, a closed position, or in one or more partially open positions. Furthermore, in some implementations, as illustrated in FIG. 7, each vent 702 is also configured to be rotatable, such that the user can direct the flow of air from the vehicle air conditioner 100 via each vent 702 individually (e.g., directing air to the driver or passenger via two vents and to the sleeping cabin area via two other vents). In some embodiments, the control assembly 700 of the vehicle air conditioner 100 also includes one or more air conditioning controls 704 for controlling various aspects of the vehicle air conditioner. For instance, in some embodiments controls are used to set the desired temperature, while in other embodiments they are used to set the blower fan 304 speed of the vehicle air conditioner 100. As illustrated in FIG. 7, the housing assembly (200, FIG. 2) is configured such that, when the vehicle air conditioner 100 is installed in the vehicle 102, the one or more air vents 702 and the air conditioning controls 704 are disposed below the roof 104 of the vehicle 102.

Figure 8:
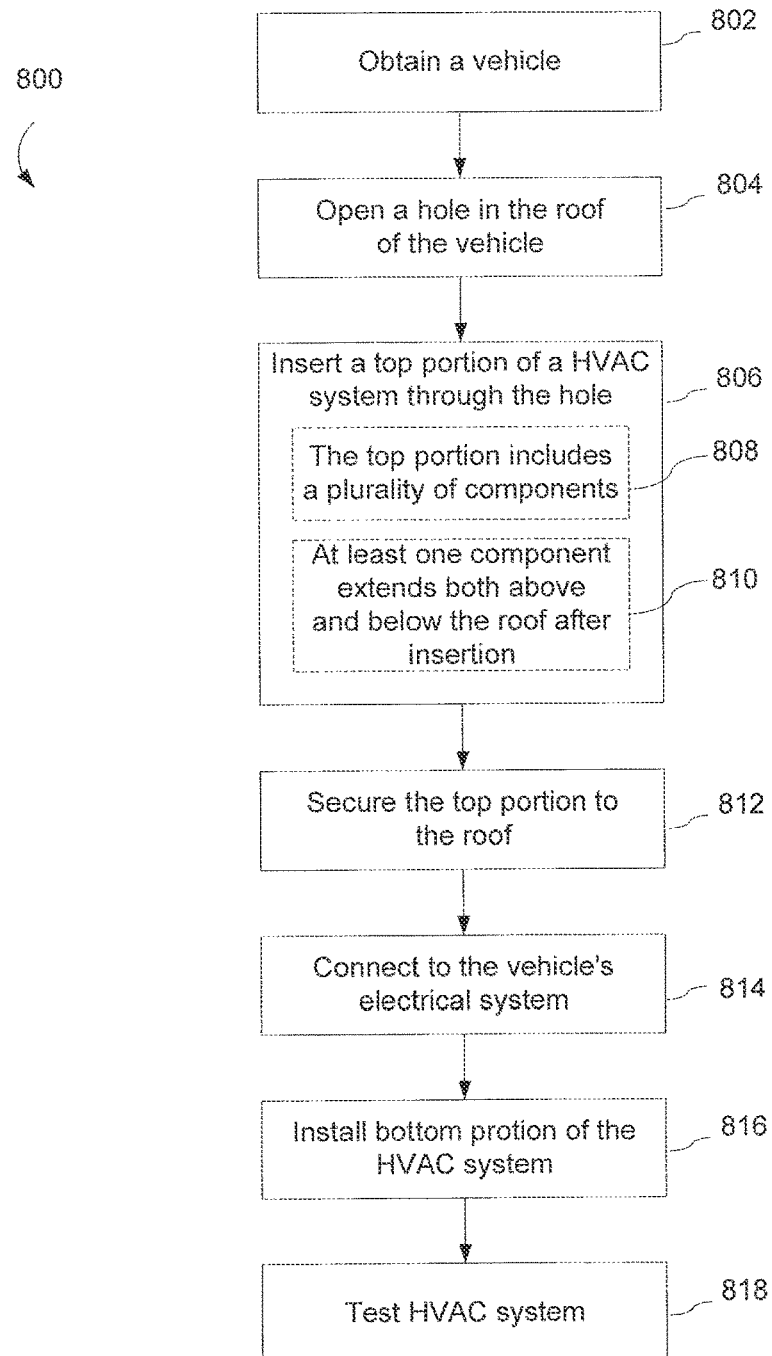
FIG. 8 is a flowchart representing a method of installing an HVAC system in the roof of a vehicle, in accordance with some embodiments.

FIG. 8 is a flowchart representing a method 800 for method of installing a HVAC system in the roof of a vehicle, according to some embodiments. A vehicle is obtained (802). Then a hole is opened in the roof (804). Some vehicles will include a hatch in the roof, and in such instances the hole is opened in the roof by removing a cover covering the hatch. In other instances the vehicle's roof will not include a hatch, and in such instances a hole is created by cutting a hole in the roof. A top portion of a HVAC system, such as a vehicle air conditioner, is inserted through the hole in the roof (806). In some instances inserting the top portion of the HVAC system includes first attaching an appropriately sized gasket to the vehicle prior to inserting the top portion of the HVAC system. In some embodiments, the insertion is done from the outside of the vehicle (i.e., the top portion of the HVAC system is inserted through the roof hole from above.). The top portion of the HVAC system includes a plurality of components, such as the air conditioning components (808). In some embodiments, the components include a compressor. In some embodiments, the components include a control panel. Inserting the first portion of a vehicle air conditioner into the through roof hole is done such that a first portion of one of the components extends above the roof of the vehicle, and a second portion of the component extends below the roof of the vehicle (810). The top portion of the HVAC system is then secured to the roof (812). In some embodiments, the securing is performed by attaching flanges or arms to the top portion of the HVAC system from the interior of the vehicle. In some embodiments, the HVAC system is connected to the electrical system of the vehicle (814). Then a bottom portion of the HVAC system is installed inside the vehicle (816). In some embodiments, the bottom portion connects directly to the top portion and locks into place. In some embodiments, the bottom portion is situated to cover all or portions of the exposed top portion (other than the vents and controls) and/or any arms or flanges used to secure the top portion to the roof. Finally, the HVAC system is tested (818). After successfully completing testing the system is ready for operation.

It is noted that, with the exception of embodiments that allow the vehicle air conditioner 100 to run off of a separate battery pack or off of shore power, the vehicle air conditioner 100 is a completely self contained unit. What is meant by self contained is that all of the HVAC components, including but not limited to the compressor(s) 302, fan(s) 304, condenser 402, and evaporator 404 are contained within with one unit which is configured to be mounted to the roof of a vehicle. This is beneficial over a split HVAC system in which some of the components are put into another unit which is mounted separately to a different portion of the vehicle because the installation of the system is done more efficiently. One of the benefits of the present invention is that it provides for a vehicle air conditioner 100 which can be installed on the roof 104 of a vehicle 102 in its entirety and still be slim enough to meet height restrictions and allow comfortable headroom for a driver.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A vehicle air conditioner, comprising:
   a housing assembly comprising a top cover, a mounting base, and a mounting surface, the mounting surface configured to contact an exterior of a roof of a vehicle; and
   a plurality of air conditioning components, including a compressor and a condenser, disposed at least partially within the housing assembly;
   wherein the housing assembly is configured such that, when the air conditioner is installed in the vehicle such that the mounting surface contacts the roof of the vehicle, a first portion of at least one of the plurality of air conditioning components extends above the roof of the vehicle, and a second portion of the at least one of the plurality of air conditioning components extends through an opening in the roof of the vehicle and below into a passenger compartment of the vehicle;
   wherein the at least one of the plurality of air conditioning components includes the compressor; and
   wherein the air conditioner is configured such that when the air conditioner is installed in the vehicle such that the mounting surface contacts the roof of the vehicle and the air conditioner is in operation, air is drawn from a gap between the roof of the vehicle and a bottom of the mounting base, through the condenser, and is expelled through the top cover.

2. The vehicle air conditioner of claim 1, wherein the mounting base includes a first recess; and wherein the compressor is disposed at least partially within the first recess.

3. The vehicle air conditioner of claim 2, wherein the at least one of the plurality of air conditioning components includes a blower fan; and wherein the housing assembly is configured such that, when the air conditioner is installed in the vehicle such that the mounting surface contacts the roof of the vehicle, a first portion of the blower fan extends above the roof of the vehicle, and a second portion of the blower fan extends through the opening in the roof of the vehicle and into the passenger compartment of the vehicle.

4. The vehicle air conditioner of claim 3, wherein the mounting base includes a second recess; and wherein the blower fan is disposed at least partially within the second recess.

5. The vehicle air conditioner of claim 1, wherein the mounting base has opposing first and second sides; and wherein the compressor extends through the mounting base from the first side to the second side.

6. The vehicle air conditioner of claim 5, wherein the at least one of the plurality of air conditioning components includes a blower fan; and wherein the housing assembly is configured such that, when the air conditioner is installed in the vehicle such that the mounting surface contacts the roof of the vehicle, a first portion of the blower fan extends above the roof of the vehicle, and a second portion of the blower fan extends through the opening in the roof of the vehicle and into the passenger compartment of the vehicle.

7. The vehicle air conditioner of claim 6, wherein the blower fan extends through the mounting base from the first side to the second side.

8. The vehicle air conditioner of claim 1, wherein the housing assembly is configured such that, when the air conditioner is installed in the vehicle such that the mounting surface contacts the roof of the vehicle, the condenser is disposed above the roof of the vehicle.

9. The vehicle air conditioner of claim 1, further including an evaporator disposed at least partially within the housing assembly, wherein the housing assembly is configured such that, when the air conditioner is installed in the vehicle such that the mounting surface contacts the roof of the vehicle, the evaporator is disposed above the roof of the vehicle.

10. The vehicle air conditioner of claim 1, wherein the housing assembly is configured such that, when the air conditioner is installed in the vehicle such that the mounting surface contacts the roof of the vehicle, a first portion of the condenser extends above the roof of the vehicle, and a second portion of the condenser extends below the roof of the vehicle.

11. The vehicle air conditioner of claim 1, further including an evaporator disposed at least partially within the housing assembly, wherein the housing assembly is configured such that, when the air conditioner is installed in the vehicle such that the mounting surface contacts the roof of the vehicle, a first portion of the evaporator extends above the roof of the vehicle, and a second portion of the evaporator extends below the roof of the vehicle.

12. The vehicle air conditioner of claim 1, wherein the vehicle is a truck.

13. The vehicle air conditioner of claim 1, wherein the vehicle air conditioner is installed in a truck.

14. The vehicle air conditioner of claim 13, wherein the truck is a cab-over-engine truck.

15. The vehicle air conditioner of claim 1, wherein the housing assembly is configured such that, when the air conditioner is installed in the vehicle such that the mounting surface contacts the roof of the vehicle, the air conditioning system extends less than 170 mm above the roof of the vehicle.

16. The vehicle air conditioner of claim 15, wherein the housing assembly is configured such that, when the air conditioner is installed in the vehicle such that the mounting surface contacts the roof of the vehicle, the air conditioning system extends less than 140 mm above the roof of the vehicle.

17. The vehicle air conditioner of claim 16, wherein the housing assembly is configured such that, when the air conditioner is installed in the vehicle such that the mounting surface contacts the roof of the vehicle, the air conditioning system extends less than 120 mm above the roof of the vehicle.

18. The vehicle air conditioner of claim 1, further comprising:
one or more air vents; and
air conditioning controls;
wherein the housing assembly is configured such that, when the air conditioner is installed in the vehicle such that the mounting surface contacts the roof of the vehicle, the one or more air vents and the air conditioning controls are disposed below the roof of the vehicle.

19. The vehicle air conditioner of claim 1, wherein the at least one of the plurality of air conditioning components includes at least two compressors.

20. The vehicle air conditioner of claim 1, wherein the housing assembly is configured such that, when the air conditioner is installed in the vehicle such that the mounting surface contacts the roof of the vehicle, the second portion of the at least one of the plurality of air conditioning components extends into a vehicle liner below the roof of the vehicle.

21. A vehicle air conditioner, comprising:
a compressor;
a blower fan; and
a housing assembly including a mounting base having a top side and an opposing bottom side, wherein a mounting surface of the bottom side of the mounting base is configured to contact a roof of a vehicle;
wherein the compressor and the blower fan are each mounted to the mounting base; and
wherein, when installed to the roof of the vehicle via the mounting base, at least a first portion of each of the compressor and the blower fan extends through an opening in the roof of the vehicle and below into a passenger compartment of the vehicle, and at least a second portion of each of the compressor and the blower fan extends above the roof of the vehicle.

22. A method of installing a vehicle air conditioner through a roof of a vehicle, comprising:
providing the vehicle having the roof defining a through hole;
providing at least a top portion of the vehicle air conditioner with a plurality of air conditioning components, including a compressor;
inserting the top portion of the vehicle air conditioner into the through hole such that a first portion of at least one of the plurality of air conditioning components extends above the roof of the vehicle, and a second portion of the at least one of the plurality of air conditioning components extends below the roof of the vehicle and into a passenger compartment of the vehicle, wherein the at least one of the plurality of air conditioning components includes the compressor;
securing the top portion of the vehicle air conditioner to the roof;
connecting an electrical system of the vehicle air conditioner to an electrical system of the vehicle; and
installing a bottom portion of the vehicle air conditioner inside the vehicle such that at least some of the top portion is covered by the bottom portion.

* * * * *